UNITED STATES PATENT OFFICE.

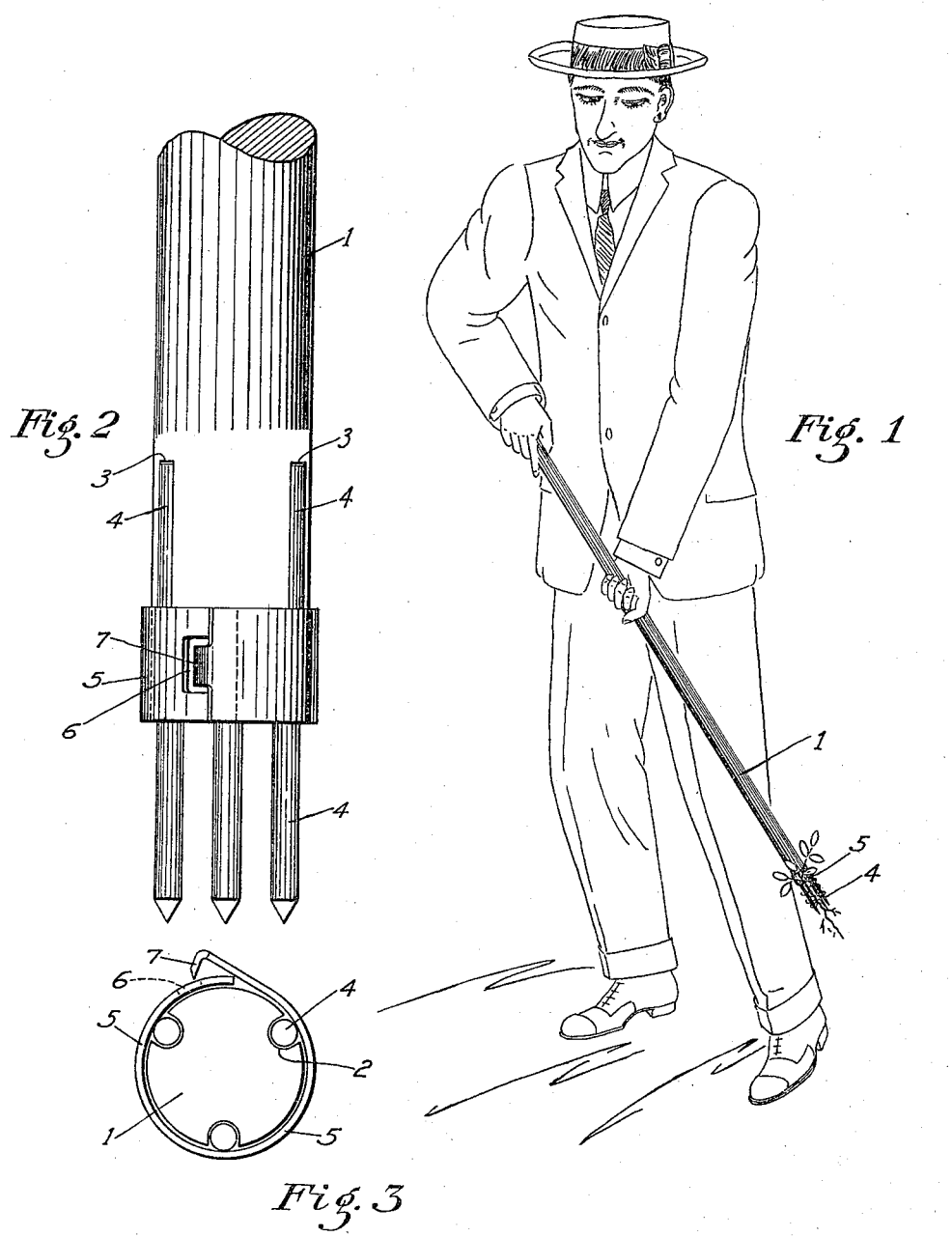

SIEGMUND KAUFMAN, OF BIRMINGHAM, ALABAMA.

WEED-PULLER.

1,134,618.   Specification of Letters Patent.   Patented Apr. 6, 1915.

Application filed November 18, 1914. Serial No. 872,796.

*To all whom it may concern:*

Be it known that I, SIEGMUND KAUFMAN, a citizen of the United States of America, residing at Birmingham, in the county of Jefferson and State of Alabama, have invented certain new and useful Improvements in Weed-Pullers, of which the following is a specification.

My invention relates to a tool more particularly designed for pulling weeds, but also having many other uses as a gardening implement.

The primary object of my invention is to devise a tool adapted to effectively remove the roots of weeds when pulling them from the ground.

Heretofore weed pullers have been designed either to cut the small or lateral roots and loosen the earth about the tap root, thereby making it easier to pull the tap root by grasping the weed by hand, or they have been designed to cause the tool to bodily grip sufficient earth about the tap root and lift it out with the weed, leaving a hole in the lawn or garden. By my invention, the tool is especially designed to avoid cutting or breaking the small lateral roots, it being intended to use the rounded prongs of the tool to engage and, as it is twisted, to draw these roots from the ground and wind them about the prongs until they afford a sufficient grip for the tool when tilted to use them as the means for pulling the weed without leaving an unsightly hole or removing a substantial quantity of earth with it for by drawing the lateral roots inwardly toward the tap root before attempting to pull them up, I necessarily restrict to a minimum the surface area disturbed when the weed is pulled.

With these objects in view, the tool has a set of rounded prongs which are pressed into the ground on all sides of the weed to be pulled and while held vertically are slowly twisted and pressed down into the earth so that they encircle the weed and draw about them its light surface or lateral roots which wrap about the prongs, whereupon the tool's handle is tilted and its pronged end lifted, drawing with it the weed and all its roots from the ground.

My invention further comprises the details of construction and arrangements of parts which in their preferred embodiments are hereinafter more particularly described and illustrated in the accompanying drawings which form a part of this specification, and in which:—

Figure 1 is a view showing the tool after it has been inserted in the ground and twisted to wrap the roots of the weed about it and has drawn the weed out. Fig. 2 is a side elevation enlarged of the tool, and Fig. 3 is a bottom view of Fig. 2.

Similar reference numerals refer to similar parts throughout the drawings.

In the preferred embodiment of my invention which is illustrated in the foregoing drawings, I show the tool as comprising a handle 1 which, at its lower end, is provided with a series of grooves 2 which have rounded bottoms and flat end walls 3 at their inner ends. I provide preferably three of these grooves, disposing them equi-distantly about the end of the handle and giving them a depth sufficient to permit the side edge of a rounded prong 4, when seated therein, to project above the periphery of the handle. These prongs are preferably straight rounded steel rods pointed at their lower ends and squared at their upper ends to abut against the end shoulder 3 of the grooves. The prongs are preferably held firmly in the grooves by means of a clasp band 5 formed by a strip of flexible metal having at one end a slot 6 and at the other end an inturned tongue 7. In practice, the prongs are seated in the grooves and the band is applied by any suitable instrument and drawn tightly about the prongs and then its pointed end 7 is driven down through the slot 6 into the handle to hold the clasp band in position about the prongs so as to grip and hold them firmly seated in the grooves. Other suitable means may be employed for fastening the prongs in place or they may be mounted on the end of the handle in other available ways, but that shown is what I regard as my preferred construction.

Having assembled the implement in the manner described, its use is as follows:— The handle is held vertically and the prongs are forced into the ground on all sides of the weed to be pulled and as the handle is pressed into the ground while still in vertical position, it is slowly twisted, thereby causing the prongs to engage and draw inwardly and wind about them the radial or surface roots of the plant. After the prongs have been forced a substantial distance into the earth, the handle is tilted to an acute angle to the ground and with two of the prongs disposed below the tap root of the plant, it is lifted upwardly, drawing with it all of the roots of the plant with a minimum surface disturbance of the ground. The several prongs are mounted in closely assembled position as it is desirable to have them work close to the weed and thereby engage the lateral roots as closely as practicable to the tap root. Moreover this arrangement limits to the smallest possible area the surface disturbed by the tool. I find that I get the most satisfactory results by using three prongs but I do not desire to limit myself to this number. When I refer to rounded prongs, I mean prongs which will not present a sharp or cutting edge to the roots as it moves with the rotation of the handle as I do not desire to cut these roots but to draw them from the ground without breaking them.

What I claim as new and desire to secure by Letters Patent, is:—

1. A weed pulling tool comprising a handle rounded at its lower end and having a series of parallel spaced side grooves which open out through its said lower end, straight prongs, the inner ends of which are adapted to seat in and bear against the upper ends of said grooves and to project slightly beyond the circumference of the handle, and a band surrounding the grooved end of the handle and adapted to engage and firmly clamp said marginal series of prongs in said grooves.

2. In a tool of the character described, a handle, axial grooves leading from one end of the handle and having square inner ends, prongs adapted to seat in said grooves and bear against said square inner ends while their sides project slightly above the handle surface, and a clasp band having a slot at one end and an inturned tongue at the other end which is adapted to be driven into the handle through said slot to hold the band about the prongs, as and for the purposes described.

In testimony whereof I affix my signature in presence of two witnesses.

SIEGMUND KAUFMAN.

Witnesses:
NOMIE WELSH,
R. D. JOHNSTON, Jr.

Copies of this patent may be obtained for five cents each, by addressing the "Commissioner of Patents, Washington, D. C."